US012648019B2

(12) United States Patent　　　　　　　(10) Patent No.:　US 12,648,019 B2
　　　Kiilerich Pratas et al.　　　　　　　　(45) Date of Patent:　　　Jun. 2, 2026

---

(54) ALIGNED SIDELINK COMMUNICATIONS

(71) Applicant: NOKIA TECHNOLOGIES OY, Espoo (FI)

(72) Inventors: Nuno Manuel Kiilerich Pratas, Gistrup (DK); Rasmus Liborius Bruun, Nørresundby (DK); Carlos Santiago Morejon Garcia, Aalborg (DK); Lianghai Ji, Aalborg (DK); Ling Yu, Kauniainen (FI); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 18/253,187

(22) PCT Filed: Nov. 11, 2021

(86) PCT No.: PCT/EP2021/081356

§ 371 (c)(1),
(2) Date: May 16, 2023

(87) PCT Pub. No.: WO2022/106294

PCT Pub. Date: May 27, 2022

(65) Prior Publication Data

US 2023/0422299 A1　　Dec. 28, 2023

(30) Foreign Application Priority Data

Nov. 18, 2020　(FI) ..................................... 20206170

(51) Int. Cl.
　H04W 74/08　　(2024.01)
　H04W 74/0808　(2024.01)
　H04W 92/18　　(2009.01)

(52) U.S. Cl.
　CPC ........ H04W 74/0808 (2013.01); H04W 92/18 (2013.01)

(58) Field of Classification Search
　CPC .......................... H04W 74/0808; H04W 92/18
　See application file for complete search history.

(56) References Cited

U.S. PATENT DOCUMENTS

2020/0322939 A1*　10/2020　Cao ........................ H04W 72/02
2021/0410158 A1*　12/2021　Xue .................... H04W 72/121

OTHER PUBLICATIONS

LG Electronics: "Discussion on feasibility and benefits for mode 2 enhancement", 3GPP Draft; R1-2007096, 3rd Generation Partnership Project (3GPP), Mobile Competence Centre; 650, Route Des Luioles; F-06921 Sophia Antipolis Cedex; France, vol. RAN WG1, No. e-Meeting; Oct. 26, 2020-Nov. 13, 2020 Oct. 24, 2020 (Year: 2020).*

(Continued)

*Primary Examiner* — Brenda H Pham
(74) *Attorney, Agent, or Firm* — Lippes Mathias LLP

(57)　　　　　ABSTRACT

In some examples, a method of wireless communication by a user equipment, UE, comprises receiving configured grant, CG, configuration data at a first UE, the CG configuration data comprising bi-directional CG information for an aligned sidelink communication session between the first UE and a second UE, monitoring for receipt of a first transmission of the communication session at the first UE, and on the basis of the monitoring, acquiring the channel for the sidelink communication session at the first UE.

11 Claims, 10 Drawing Sheets

(56) References Cited

OTHER PUBLICATIONS

International Search Report and Written Opinion for International Application No. PCT/EP2021/081356, mailed on Feb. 23, 2022, 18 pages.

3GPP TSG RAN WG1 #98, R1-1909054; "Considerations on NR V2X Physical Layer Procedure", Agenda Item: 7.2.4.5; Source: Apple; Prague, Czech Republic; Aug. 26-30, 2019, 6 pages.

3GPP TSG RAN WG1 Meeting #103-e, R1-2007896; "Discussion on Feasibility and Benefits for Mode 2 Enhancement"; Agenda Item: 8.11.2.2.; Source: LG Electronics; e-Meeting; Oct. 26-Nov. 13, 2020, 26 pages.

3GPP TSG RAN WG1 #98bis, R1-1910373; "Mode 1 Resource Allocation for NR SL"; Source: OPPO; Agenda Item: 7.2.4.2.1; Chongqing, China; Oct. 14-20, 2019, 8 pages.

3GPP TSG RAN WG1 Ad-Hoc Meeting 1901, R1-1900063; "Transmission with Configured Grant in NR Unlicensed Band", Agenda Item: 7.2.2.2.4; Source: Huawei, HiSilicon; Taipei, Taiwan; Jan. 21-25, 2019; 13 pages.

* cited by examiner

101

Initiating UE

103

Responding UE

105

LBT Cat. 4 | Transmission

≥ 25us

Transmission

COT Duration 301  307  303  305

UE A  UE B  UE C

LBT Cat 4

PSCCH/PSSCH

309

LBT Cat 1 or Cat 2

PSFCH

LBT Cat 4

PSCCH/PSSCH

LBT Cat 1 or Cat 2

PSFCH

LBT Cat 4

PSCCH/PSSCH

LBT Cat 1 or Cat 2

PSFCH

Channel Occupation Time (COT) between UE A and UE B

Channel Occupation Time (COT) between UE B and UE C

Channel Occupation Time (COT) between UE A and UE C

ALIGNED SIDELINK COMMUNICATIONS

CROSS-REFERENCE TO RELATED APPLICATIONS

This application is a national stage entry of International Application No. PCT/EP2021/081356, filed Nov. 11, 2021, entitled "ALIGNED SIDELINK COMMUNICATIONS" which claims the benefit of priority of Finnish Application No. 20206170, filed Nov. 18, 2020, both of which are hereby incorporated by reference in their entireties.

TECHNICAL FIELD

Aspects relate, in general, to telecommunication networks, and more specifically, although not exclusively to aligned sidelink communications between user equipment.

BACKGROUND

In a telecommunications network, the frameworks for downlink (i.e., signals are forwarded from a base station to a user equipment (UE)) and uplink transmissions (i.e., signals are forwarded from a UE to a base station) are widely deployed. In the context of these frameworks, physical signals transmitted from/to UEs are relayed by network base stations. In contrast, sidelink transmissions enable direct communications between two UEs without signal relay through a base station. Such transmissions may be used for, e.g., public safety and vehicle-to-everything (V2X) services. Sidelink transmissions continue to be of interest in 3GPP New Radio (NR), enabling low latency, high reliability and high throughout services.

SUMMARY

According to an example, there is provided a method of wireless communication comprising receiving configured grant, CG, configuration data at a first UE from a second UE, the CG configuration data comprising bi-directional CG information for communication session between the first UE and the second UE, monitoring for receipt of a first transmission of the communication session at the first UE, on the basis of the monitoring, acquiring the channel for the sidelink communication session at the first UE. In an example, the communication session is an aligned sidelink (SL) communication session between the first and second UEs. In this sense, alignment of the SL communication session is enabled, at least in part, by the CG data that is shared between the UEs. Thus, advantageously, a CG mode of operation is provided in which, whenever a SL transmitting UE device (e.g. the second UE) is unable to acquire access to the channel (e.g., due to an LBT Type 1 failure) a SL receiving UE device (e.g., the first UE) attempts to acquire the channel occupancy time. If successful, SL receiving UE device can aid the SL transmitting UE device to acquire the channel. In an implementation, the first UE can transmit CG configuration data, such as to the second UE for example.

The method can further comprise performing a first channel access process, whereby to enable access to the channel for a channel occupancy time, and transmitting a feedback message to the second UE indicating acquisition of the channel for the channel occupancy time. The feedback message can be transmitted using a physical sidelink feedback channel specified in the CG configuration data. The feedback message can be transmitted using a physical sidelink control channel or a physical sidelink shared channel. The feedback message can be transmitted in a CG configuration data message. The feedback message can be transmitted in a resource allocation message. The channel access process can comprise performing a listen-before-talk radio protocol. A second channel access process can be performed at the second UE.

According to an example, there is provided user equipment comprising a radio frequency, RF, circuitry component configured to transmit or receive communication signals on an unlicensed spectrum, and a processor coupled to the RF circuitry component, configured to receive configured grant, CG, configuration data comprising bi-directional CG information for an aligned sidelink communication session within the unlicensed spectrum with a second UE, monitor for receipt of a first transmission of the sidelink communication session, and acquire the channel for the sidelink communication session. The processor can further be configured to generate a first listen before talk, LBT, protocol to determine a sidelink channel state, and in response to determining an idle channel state, communicate a feedback message indicating acquisition of the channel. The processor can further be configured to trigger a second LBT protocol at the second UE.

According to an example, there is provided a computer/machine-readable storage medium storing executable instructions that, in response to execution, cause a processor of a user equipment to perform operations to aid the acquisition of a communication session, such as an aligned sidelink communication session, the operations comprising receiving CG configuration data comprising bi-directional CG information for the aligned sidelink communication session, monitoring for receipt of a first transmission of the communication session, and on the basis of the monitoring, acquiring the channel for the sidelink communication session. The computer-readable storage medium can further comprise instructions that, in response to execution, cause the processor to perform operations comprising: generating a first listen before talk, LBT, protocol to determine a sidelink channel state; and in response to determining an idle channel state, communicating a feedback message indicating acquisition of the channel; triggering a second LBT protocol for the aligned sidelink communication session at a second UE

BRIEF DESCRIPTION OF THE DRAWINGS

For a more illustrative understanding of the present disclosure, reference is now made, by way of example only, to the following descriptions taken in conjunction with the accompanying drawings, in which.

DESCRIPTION

Figure 1:
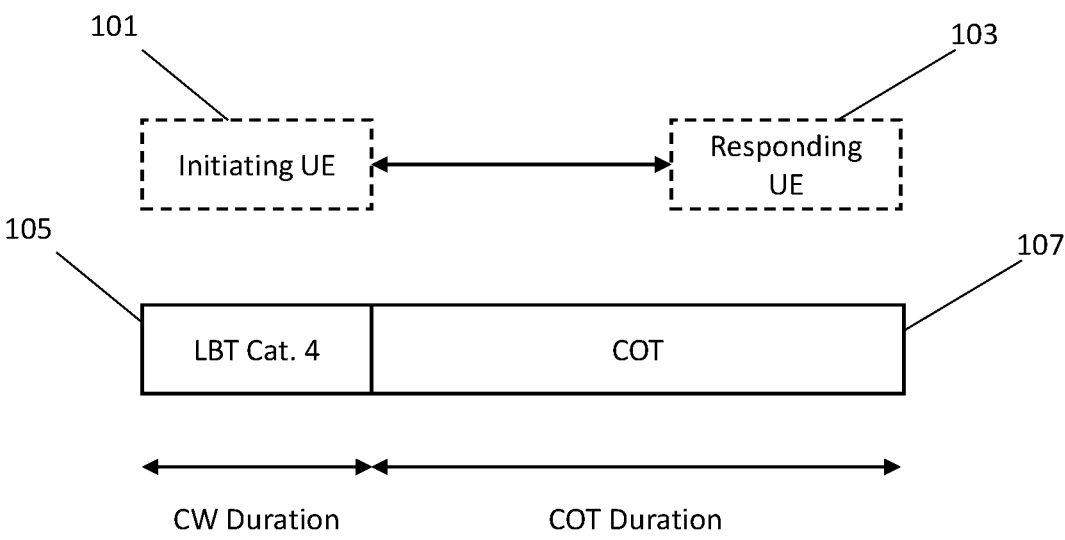
FIG. 1 is a schematic representation of the acquisition of the COT by an initiating UE via LBT Cat. 4 (LBT Type 1) for the purposes of acquiring a channel for a sidelink communication session between a pair of UEs.

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The scarcity of licensed spectrum for cellular communications has driven interest in the use of unlicensed bands. For example, less crowded 5 GHz bands (used mostly for, e.g., WiFi) offer the potential for a substantial increase in throughput by way of sidelink (SL) communications between UEs. However, currently there are no new radio (NR) sidelink specifications that describe operation in the unlicensed spectrum (e.g., coexisting with IEEE 802.11).

In sub-7 GHz unlicensed bands, NR coexistence with other systems can be enabled via a Listen Before Talking (LBT) channel access mechanism. In such LBT mechanisms, a UE intending to perform a sidelink transmission needs first to successfully complete an LBT check, before being able to initiate that same transmission. That is, a UE intending to transmit to another UE (unicast) or UEs (group/broadcast) over a channel listens to detect potential interference on the channel, only transmitting in the absence of interfering signals above a given threshold.

For a UE to pass an LBT check it must observe the channel as available for a number of consecutive Clear Channel Assessment (CCA) slots. For example, in the sub-7 GHz bands the duration of these slots is 9 μs. The UE deems the channel as available in a CCA slot if the measured power (i.e., the collected energy during the CCA slot) is below a regulatory specified threshold (which can depend on the operating band and geographical region).

When a UE initiates the communication (i.e., when a UE takes the role of initiating device), then this UE has to acquire the "right" to access the channel for a certain period of time—denoted as the Channel Occupancy Time (COT)—by applying an "extended" LBT procedure where the channel must be deemed as free for the entire duration of a Contention Window (CW). This "extended" LBT procedure, is known as LBT Category 4 (LBT Cat. 4) although in, e.g., the 3GPP technical specification TS 37.213 it is identified as LBT Type 1.

FIG. 1 is a schematic representation of the acquisition of the COT by an initiating UE via LBT Cat. 4 (LBT Type 1) for the purposes of acquiring a channel for a sidelink communication session between a pair of UEs. An initiating UE 101 performs an LBT Cat. 4 check for a period of time defined by the CW duration. If the check is successfully passed, i.e., if the channel is free for the entire duration of the CW, the channel is acquired for the COT duration.

The duration of both the COT and CW depends on the Channel Access Priority Class (CAPC) associated with the UE's traffic. For example, as shown below in Table 1, control plane traffic (such as, e.g., Physical Sidelink Shared Channel (PSCCH)) is transmitted with p=1, while user plane traffic has p>1.

TABLE 1

Channel Access Priority Class (CAPC) for UL. The contention window length in CCA slots associated with each CAPC has a minimum $(CW_{min,\,p})$ and maximum $(CW_{max,\,p})$. The duration of the COT is given by $T_{ulm\,cot,\,p}$.

| Channel Access Priority Class (p) | $m_p$ | $CW_{min,\,p}$ | $CW_{max,\,p}$ | $T_{ulm\,cot,\,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:

For p = 3, 4, $T_{ulm\,cot,\,p}$ = 10 ms if the higher layer parameter absenceOfAnyOtherTechnology-r14 or absenceOfAnyOtherTechnology-r16 is provided, otherwise, $T_{ulm\,cot,\,p}$ = 6 ms.

NOTE 2:

When $T_{ulm\,cot,\,p}$ = 6 ms it may be increased to 8 ms by inserting one or more gaps. The minimum duration of a gap is 100 us. The maximum duration before including any such gap is 6 ms.

With reference to FIG. 1, the UE initiating the transmission (the initiating UE 101) acquires the COT with a duration associated with the corresponding CAPC upon successfully completing the LBT Cat. 4 and performing a transmission. The acquired COT is valid even in the case where the initiating device 101 pauses its transmission, although if the initiating device wants to perform a new transmission (within the COT) it is still required to perform a "reduced" LBT procedure. This "reduced" LBT procedure is commonly known as LBT Category 2 (LBT Cat. 2) or LBT Category 1 (LBT Cat. 1) although in 3GPP TS 37.213 it is identified as LBT Type 2.

Figure 2A:
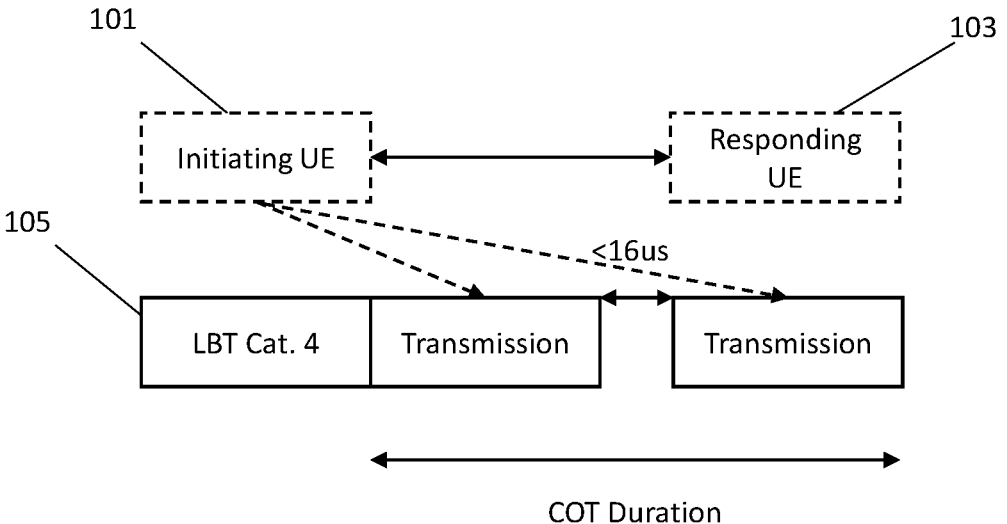
FIGS. 2a to 2f are schematic representations of the variants for LBT Type 2.
Figure 2B:
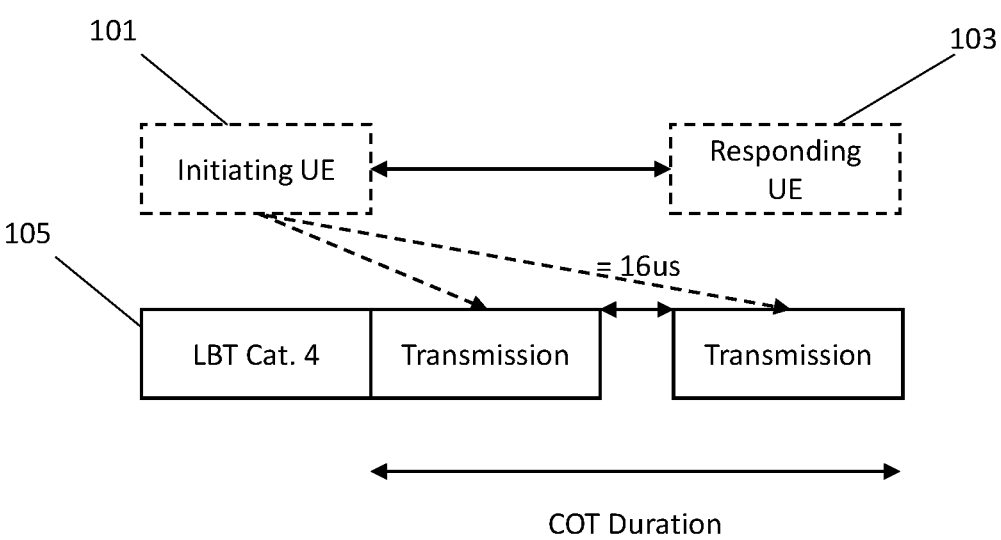
Figure 2C:
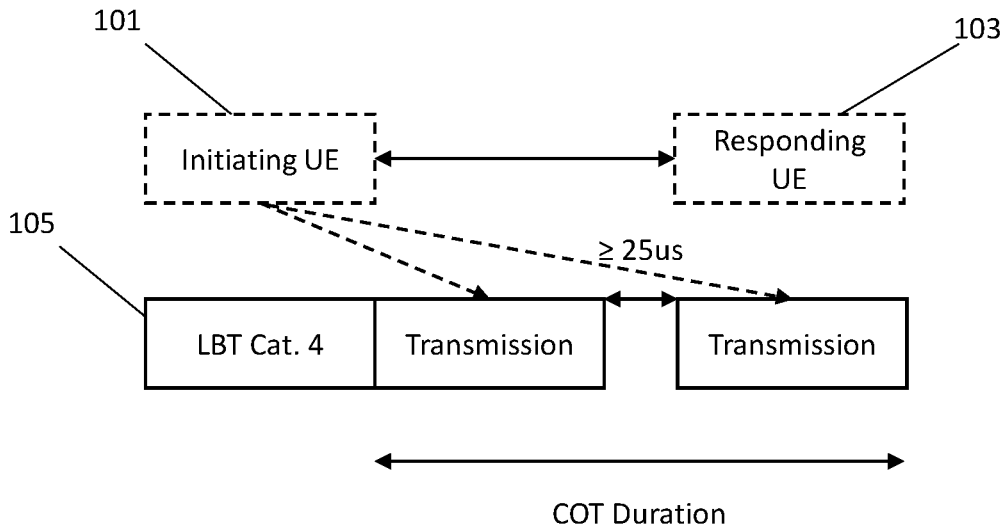
Figure 2D:
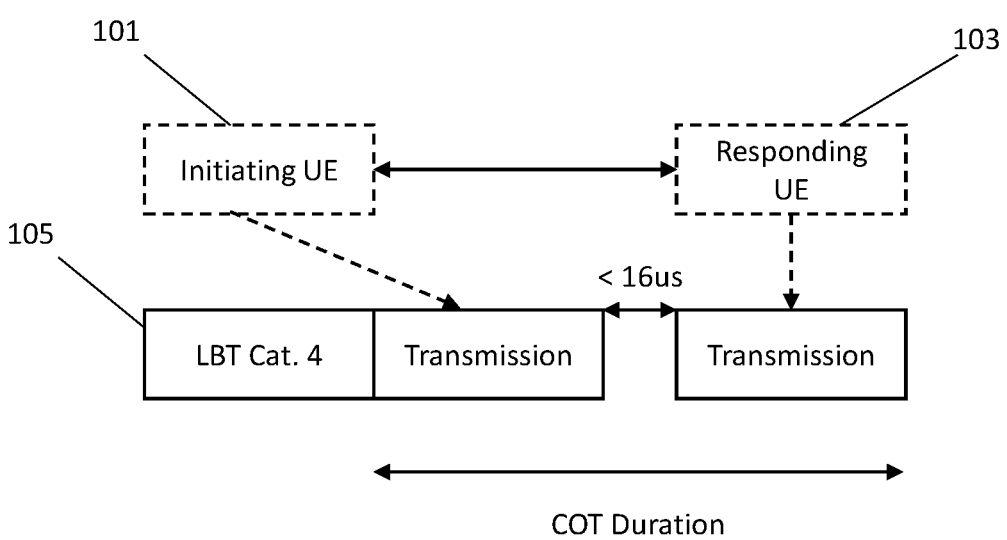
Figure 2E:
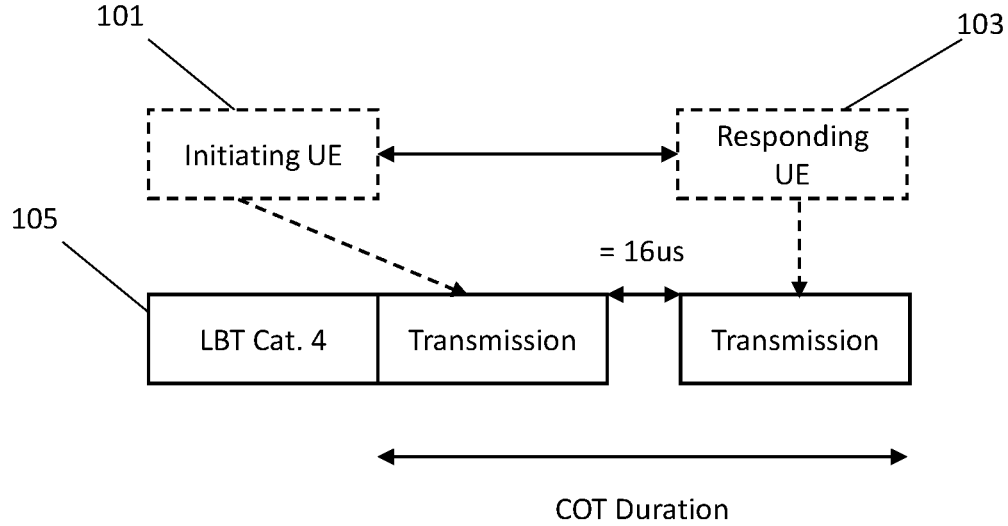
Figures 2F, 3:
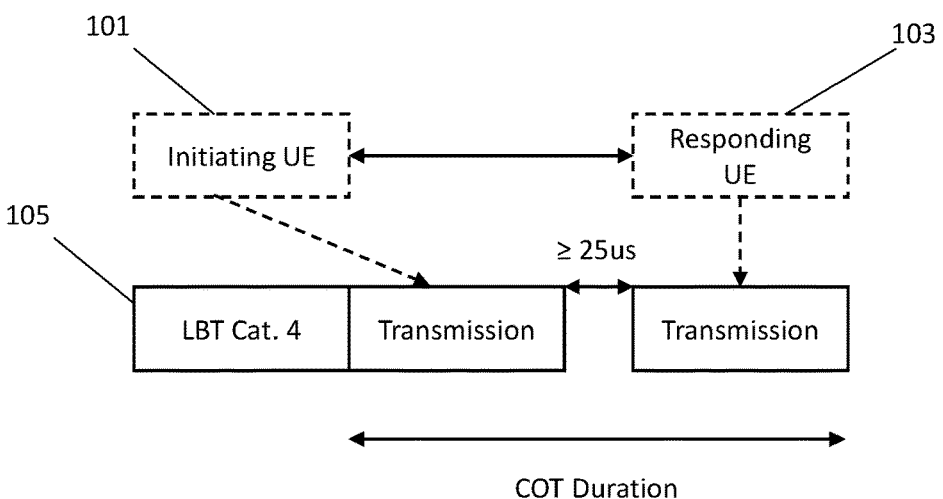
FIG. 3 is a flowchart illustrating a scenario in which a responding device has to acquire a new COT.

FIGS. 2a to 2f are schematic representations of the variants for LBT Type 2. FIGS. 2c and 2f depict a variant "Type 2A" (25 μs LBT Cat. 2) for SL transmissions within the initiating device acquired COT (in case the gap between two SL transmissions is 25 μs, as well for SL transmissions following another SL transmission). FIGS. 2b and 2e depict a variant "Type 2B" (16 μs LBT Cat. 2) for SL transmission within the initiating device acquired COT (can only be used for SL transmissions following another SL with gap exactly equal to 16 μs). FIGS. 2a and 2d depict a variant "Type 2C" (no UL LBT, LBT Cat. 1), which may only be used for SL transmission following another SL, with a gap <16 μs and the allowed duration of the SL transmission≤584 μs).

The variants of FIGS. 2a, 2b and 2c show the case where the gap is between the two transmissions both from the initiating UE, while those of FIGS. 2d, 2e, and 2f show the case where the gap is between the two different transmissions from the initiating UE and the responding UE 103 correspondingly.

FIG. 3 is a flowchart illustrating a scenario in which a responding device has to acquire a new COT. An initiating device (UE A) 301 can share its acquired COT with its intended receiver (the responding UE), UE B 303. For this purpose, the UE A 101 explicitly informs (i.e., via control signaling 307) the responding device 303 about the duration of this COT. The responding device 303 can use this information to decide (309) which category/type of LBT it should apply upon performing a transmission for which the intended receiver is the initiating device 301. In case either the responding device 303 transmission falls outside the COT or the responding device 303 wants to perform a transmission to another device 305 other than the original initiating device 301, then the responding device 303 will have to acquire a new COT using the LBT Cat. 4 mechanism with the appropriate CAPC as depicted in FIG. 3.

The Configured Grant configuration and operation depends on the prevailing resource allocation mode. In mode 1, where, e.g., a next generation node B (gNB) is responsible for the allocation of SL resources, the configuration and operation are similar to that over the radio interface between a UE and the radio access network (the Uu interface).

In mode 2, UEs engaging in a SL communication session perform resource selection autonomously with the aid of a sensing procedure in which, e.g., SCI(s) and/or SL measurements from other UEs are decoded. Decoding SCI(s) provides (at least) information on SL resources indicated by the UE transmitting the SCI. The sensing procedure can use a L1 SL RSRP measurement based on SL DMRS when the corresponding SCI is decoded. The resource (re-)selection procedure can use the results of the sensing procedure to determine resource(s) for SL transmission.

Figure 4:
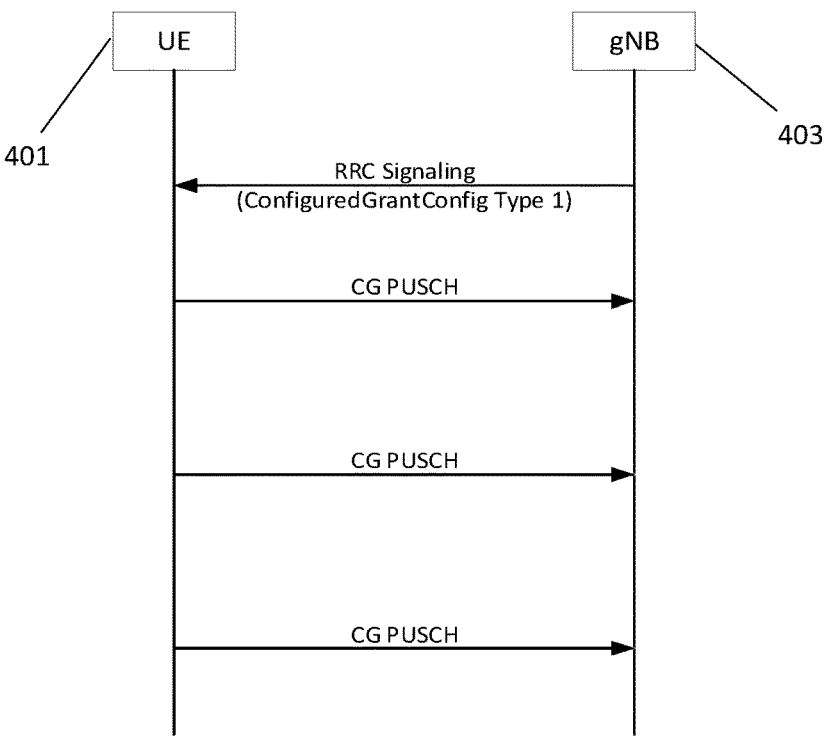
FIG. 4 is a schematic representation of a Type 1 configuration grant mode between a UE and a gNB.
Figure 5:
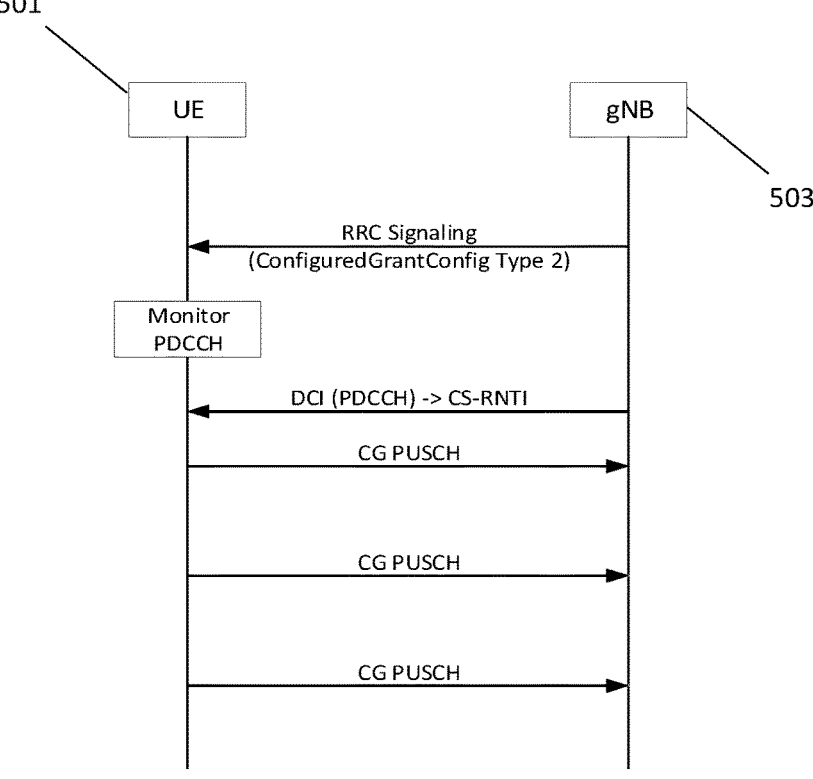
FIG. 5 is a schematic representation of a Type 2 configuration grant mode between a UE and a gNB.

Accordingly, whenever a UE requires sidelink resources, e.g., to convey periodically occurring traffic (regardless of whether such is unicast, broadcast or groupcast etc.), it can utilize Configured Grants. In the licensed spectrum, the resources associated with the CG transmission are ensured by the scheduler on the network side in case of mode 1 or by UEs' sensing and resource reservation indication in SCI in case of mode 2. In this connection, FIG. 4 is a schematic representation of a Type 1 configuration grant mode between a UE 401 and gNB 404, and FIG. 5 is a schematic representation of a Type 2 configuration grant mode between a UE 501 and gNB 503. CG mode Type 1 can be configured completely via RRC signalling including the periodicity and starting time, whereas Type 2 is partly configured via RRC signalling but the actual starting time is triggered via the PDCCH.

In the unlicensed spectrum, a UE will have to perform an LBT check before being able to transmit in any resources. This is the case even for reserved CG resources. Therefore, if there is congestion at the transmitter side the LBT check will likely fail and the UE will be prevented from accessing the resource reserved for the device's CG transmission.

Figure 6:
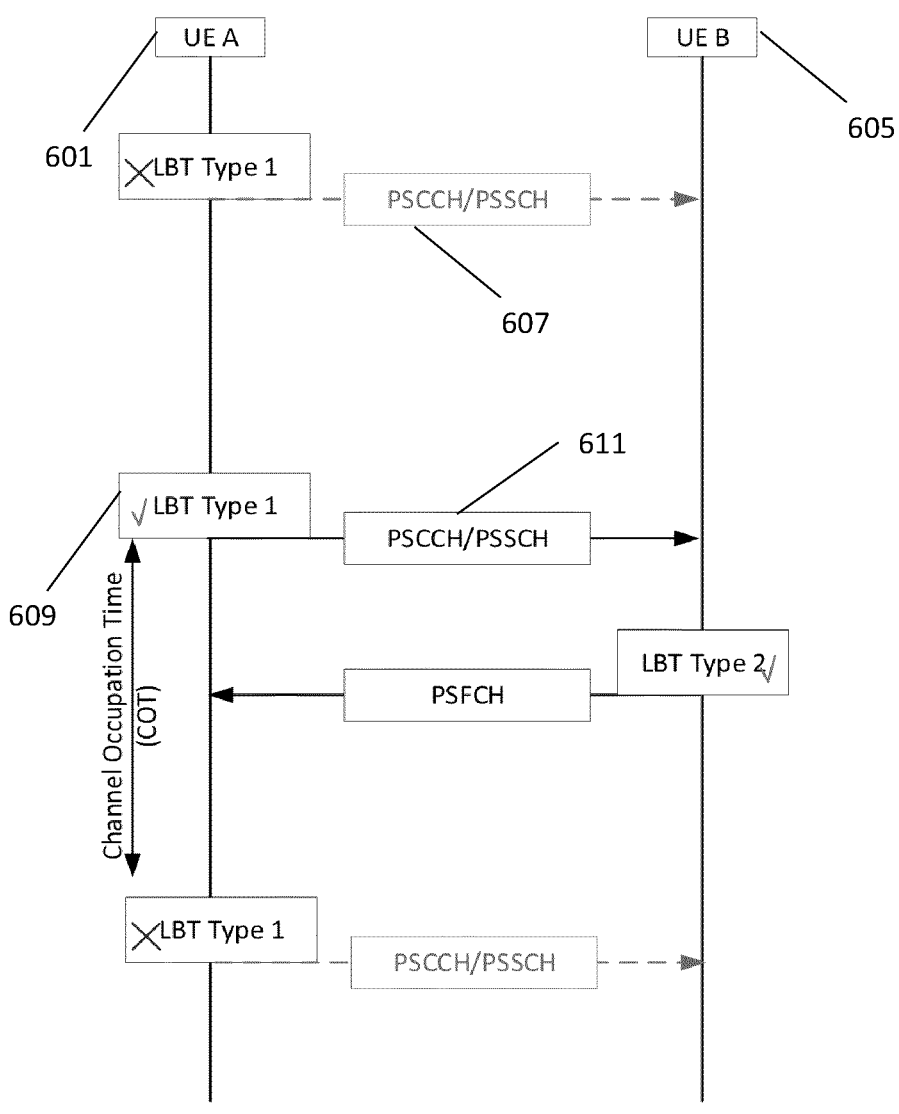
FIG. 6 is a schematic representation of a process to perform an LBT check.

FIG. 6 is a schematic representation of a process to perform an LBT check. In the example of FIG. 6 a UE 601 performs an LBT Type 1 check 603. However, as a result of, e.g., congestion, the check fails and there is no indication to the UE 605 that is to take part in the bi-directional SL communication session in the form of the control signaling 607. A subsequent attempt to perform an LBT check 609 is successful, resulting in control signaling 611 informing UE 605 of the COT duration.

Accordingly, the SL CG operation is defined without taking into account the LBT mechanism required that is used to enable coexistence in unlicensed bands (e.g., 2.4 GHz and 5 GHz where IEEE 802.11 and other systems are also deployed).

According to an example, there is provided a CG mode of operation in which, whenever a SL transmitting UE device is unable to acquire access to the channel (e.g., due to LBT Type 1 failure) a SL receiving UE device attempts to acquire the COT. If successful, SL receiving UE device can aid the SL transmitting UE device to acquire the channel under LBT Type 2.

Figure 7:
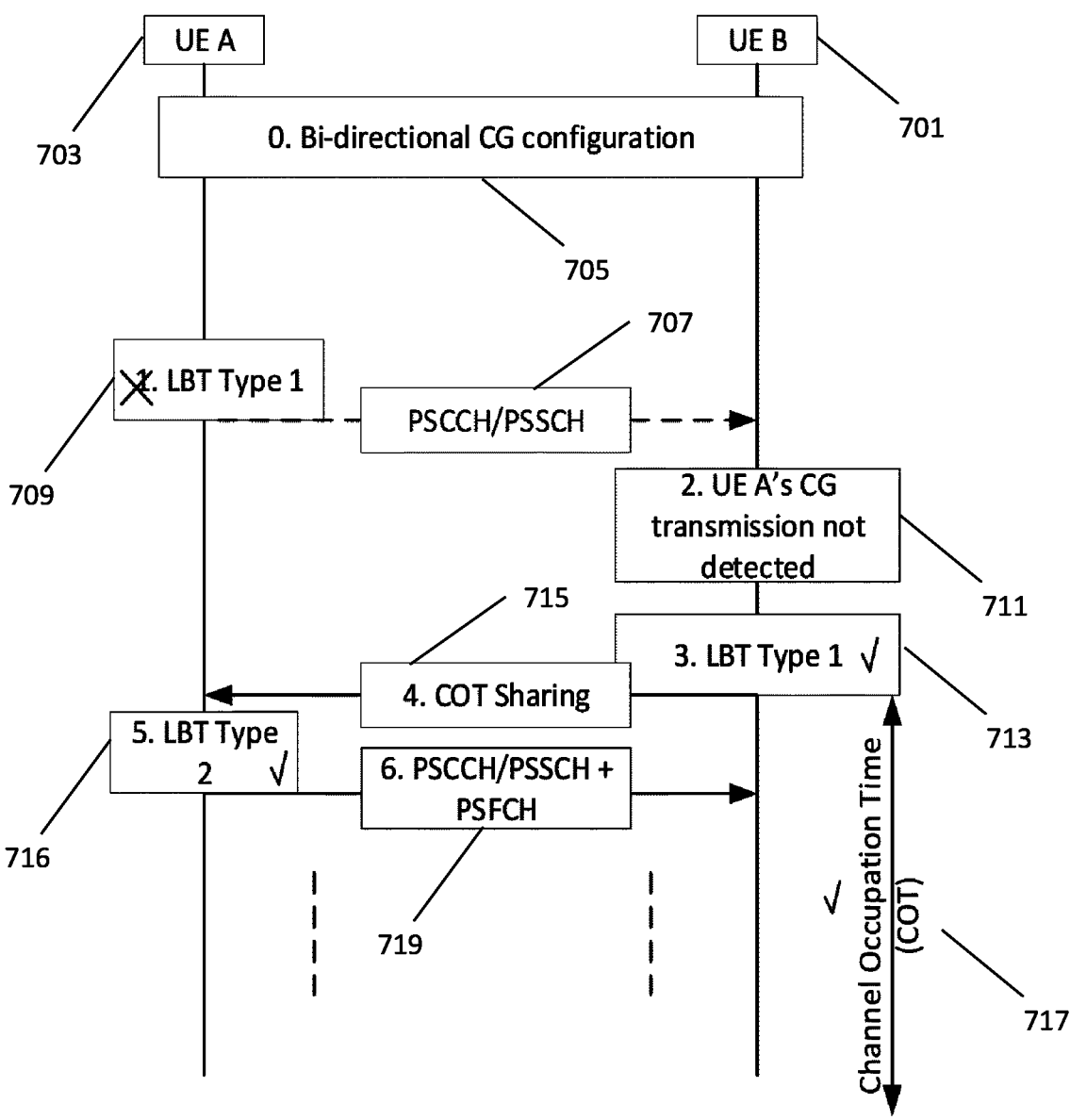
FIG. 7 is a schematic representation of a method according to an example.

FIG. 7 is a schematic representation of a method according to an example. In the example of FIG. 7, UE A 703 (second UE) shares with UE B 701 (first UE) a receiver aided COT acquisition CG configuration 705, also referred to as bi-directional CG configuration data. The CG configuration data 705 is such that it configures the receiving UE 701 (UE B) with a resource that allows it to aid the transmitting UE 703 (UE A) to access a channel for an aligned sidelink communication session between the UE A 703 and the UE B 701 via COT sharing signaling in case the transmitting UE 703 fails to acquire access to the channel due to LBT failure. Accordingly, UE B 701 receives CG configuration data 705 comprising bi-directional CG information for an aligned sidelink communication session between it and UE A 701.

UE B 701 can monitor for receipt of a first transmission of the communication session 707, and, on the basis of the monitoring, can acquire the channel for the sidelink communication session. That is, as a result of failure at UE A 703 of an LBT Type 1 check 709, UE A's CG transmission 707 is not detected (711) at UE B 701. Thus, UE B 701 can perform an LBT Type 1 check 713 at its side.

The bi-directional CG/SPS configuration may be configured in such way that CG/SPS transmission resources from UE A to UE B may be associated with feedback (e.g. PSFCH) resources in semi-persistent way. In addition to use of PSFCH for HARQ feedback, the associated PSFCH resources can also be used for UE B to provide COT sharing information 715 to UE A 703 to enable UE A to use the next CG/SPS occasion for its SL transmission using, e.g., LBT Type 2C 716. To achieve this, the next CG/SPS occasion should be within the valid COT period 717 of associated feedback resources in time domain.

In an alternative example, the bi-directional CG/SPS configuration may be configured such that CG/SPS transmission resources are secondarily used by UE B 701 to transmit to UE A 703 if UE B 701 does not receive an SL transmission in the previous CG/SPS occasion. In this case, UE B 701 may use the bi-directional CG/SPS to transmit a COT indication to UE A 703 to trigger UE A 703 to transmit to UE B 701 using LBT Type 2C with dynamic resource allocation (RA).

In the example of FIG. 7, UE A 701 is the primary device to perform its transmission using the configured bi-direction CG/SPS. Therefore, it attempts to capture the channel with LBT Type 1 (or Type 2 if UE A previously acquired the COT). However, in this example the LBT Type 1 check 709 failed and the COT was not acquired. Therefore, according to an example, UE B 701 does not detect UE A's transmission 707 on the configured CG/SPS resources and therefore initiates its own attempt to start the channel acquisition.

UE B 701 attempts an LBT Type 1 check 713 (under the assumption that it has not acquired the COT previously). In the example of FIG. 7, the LBT Type 1 check 713 performed by UE B 701 succeeds and the COT 717 is acquired by UE B 701.

The receiver (i.e. UE B 701) initiates the receiver aided COT acquisition, via COT sharing signaling 715. Depending on the bi-directional CG/SPS configuration, UE B 701 may determine how to deliver the COT indication 715 to UE A 703. In an example, UE B 701 can perform its PSFCH transmission (assuming that the information about which PSFCH resources to use is given in the Bi-directional CG configuration), which indicates to UE A 703 that UE B 701 has acquired the COT. In an alternative example, UE B 701 can use a PSCCH/PSSCH to indicate the shared COT. In this setting, UE B 701 can transmit COT sharing information in a dynamic resource allocation (RA) manner or use the next occasion of the bi-directional CG configuration to indicate the details of the acquired COT to UE A 703. The selection of which approach to use can also depend on whether UE B 701 has anything to transmit and/or the QoS requirements of the data in UE A 703. Furthermore, the dynamic RA may be triggered closer to the next CG occasion to give UE A 703 more time to utilize LBT Type 2 for the upcoming CG transmissions, e.g., when UE A 703 should only use the CG for its transmission (e.g. in inter-RAT control).

The transmitter (UE A 703) receives the COT information 715 from UE B 701 and initiates an LBT Type 2 check 716. The selected LBT type depends on the time interval between the end of UE B's transmission and the start of UE A's transmission. Specifically, UE A 703 can initiate an LBT Type 2C check (i.e., it transmits within 16 us of the end of UE B's transmission) or an LBT Type 2A or B check (i.e., it transmits after 16 us of the end of UE B's transmission). UE A 703 performs the transmission 719 of its PSCCH/PSSCH either using bi-directional CG/SPS occasion or dynamic RA depending on whether the COT is received from UE B 701 using associated PSFCH resources or PSCCH/PSSCH resources of the bi-direction CG/SPS.

According to an example, the communication session between UE A and UE B uses a bi-directional CG configuration. That is, the CG configuration ensures that the activities of both UE A and UE B are sequential in time so that if UE A fails to acquire the channel it can still be aided by UE B. Furthermore, the bi-directional CG configuration informs who is the intended receiver(s) of the CG. In an example, a transmission to the intended receiver(s) is prioritized in the resources of the bi-directional CG configuration compared to traffic for other receiver(s) in the LCP procedure.

As noted above, in SL mode 2 (i.e., where UEs sense and select which resources to use autonomously), the contents of CG configuration data and the procedure on how to perform the bi-directional CG configuration is, according to an example, as follows:

In the case that UE A 703 takes the role of master, CG configuration data is sent from UE A to UE B 701 and includes information of when (time) and where (frequency) the transmit activity of UE A and UE B will take place. This configuration data can include a flag that signals UE B to attempt acquire the channel whenever it misses UE A transmission 707 for example.

In the case that UE A negotiates with UE B, CG configuration data is sent from UE A to UE B and includes information relating to the time and frequency of transmit activity of UE A. Upon receiving this configuration, UE B can reply back with its own configuration, which includes information relating to the time and frequency of transmit activity of UE B. In this case, an alternative approach could be that UE A sends its traffic periodicity to UE B. Based on that, UE B can therefore derive and sends back to UE A the corresponding time-and/or-frequency resources of UE B's activity/transmission. This approach gives flexibility for UE B to configure/select the best CG to assist UE A's transmission, based on UE B's local condition. Further, some inter-UE coordination in the message sent from UE A to UE B can be exploited. For example, UE A may indicate some preferred time offsets in addition to the mentioned traffic periodicity to UE B. The preferred time offsets can be selected by taking account of UE A's condition/activity, e.g., UE A may exclude the resource(s) based on the outcome of its sensing procedure and/or the resource(s) that are not suitable due to the half-duplex constraint. From the received set of the time offsets preferred by UE A, UE B may select the best time offset by considering its local traffic, e.g., towards other UEs. With this approach, both conditions from UE A and UE B will be considered to select the best CG. In this case each UE indicates whether it helps its peers to acquire the COT and which resources it will use when doing so (e.g., to ensure that the peer can use LBT Type 2).

Figure 8:
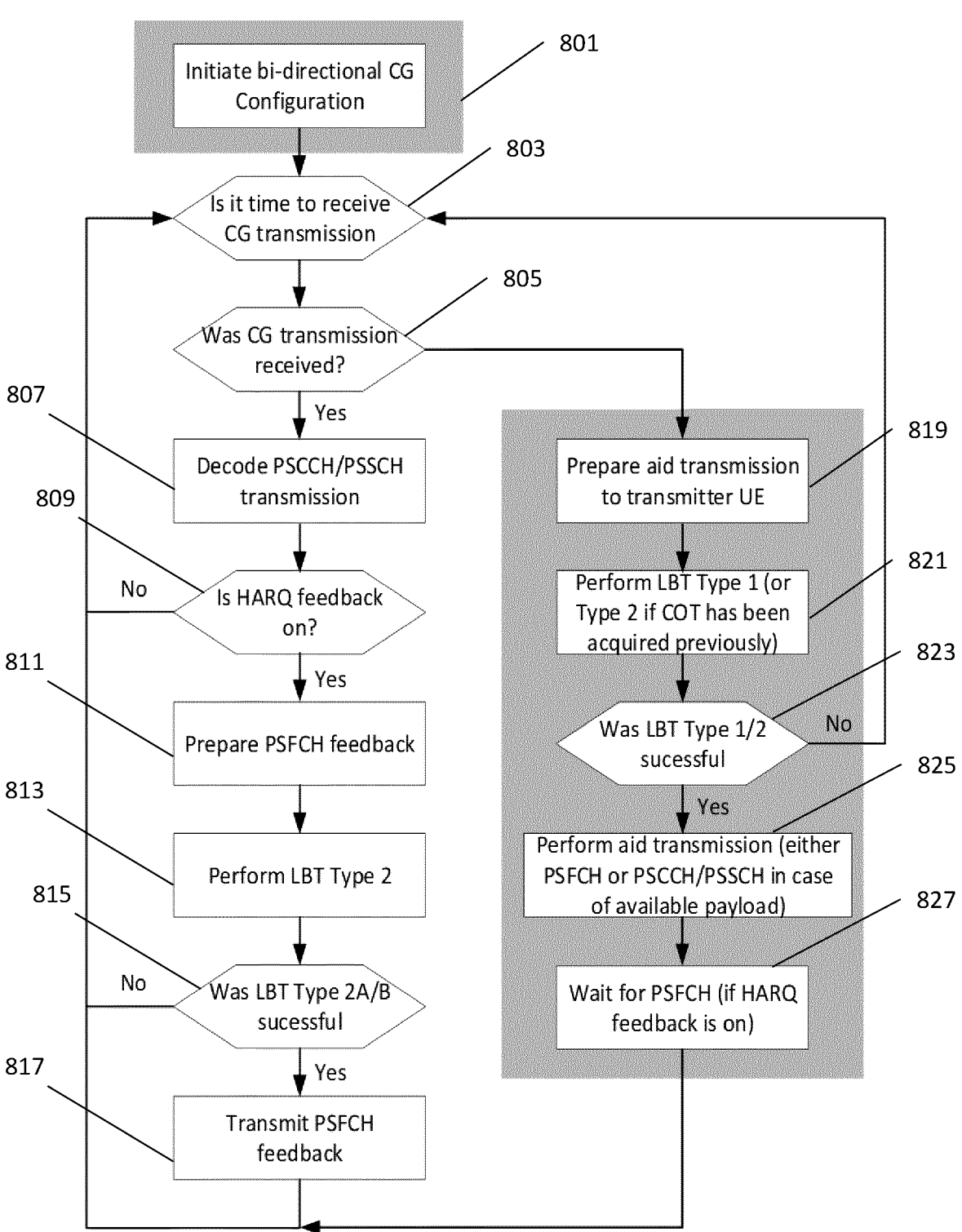
FIG. 8 is a flowchart of a method according to an example.

FIG. 8 is a flowchart of a method according to an example. In the flowchart of FIG. 8 a first UE, representing a receiving device (e.g., UE B) is used to aid a second UE, representing a transmitting device (e.g., UE A), in acquisition of a COT as a result of failure of an LBT check at the transmitting device. In block 801 an aligned sidelink communication session between the first UE (703) and a second UE (703) is initiated. In the example of FIG. 8, the session is initiated by CG configuration data comprising bi-directional CG information being received by the first UE (e.g., UE B). In block 803, the first UE determines whether it is time to receive a CG transmission from the second UE. The CG transmission can, for example, be transmission 707. In block 805, the first UE determines whether the CG transmission was received. If it was, in block 807, the transmission can be decoded. In block 809, if HARQ feedback is enabled, a PSFCH feedback message can be prepared (block 811), else the process reverts to block 803. In block 813, an LBT Type 2 check can be performed. If successful (block 815), PSFCH feedback can be sent (block 817), else the process reverts to block 803.

According to an example, if, in block 805, the first UE determines that the CG transmission was not received, it can prepare to aid transmission of the transmitting device (block 819) by performing (block 821) an LBT Type 1 check (or an LBT Type 2 check if the COT has been acquired previously), forming a first channel access process. In block 823, the first UE determines whether the LBT check of block 821 was successful. If it was, then at block 825, the first UE can indicate to the second UE that it has acquired the COT. It can then wait (block 827) for a PFSCH message from the second UE. If the LBT check of block 823 was not successful, the process can revert to block 803. This enables a device (e.g., the second UE) experiencing severe interference/congestion to still access the channel via COT established by the intended receiver (e.g. the first UE).

Figure 9:
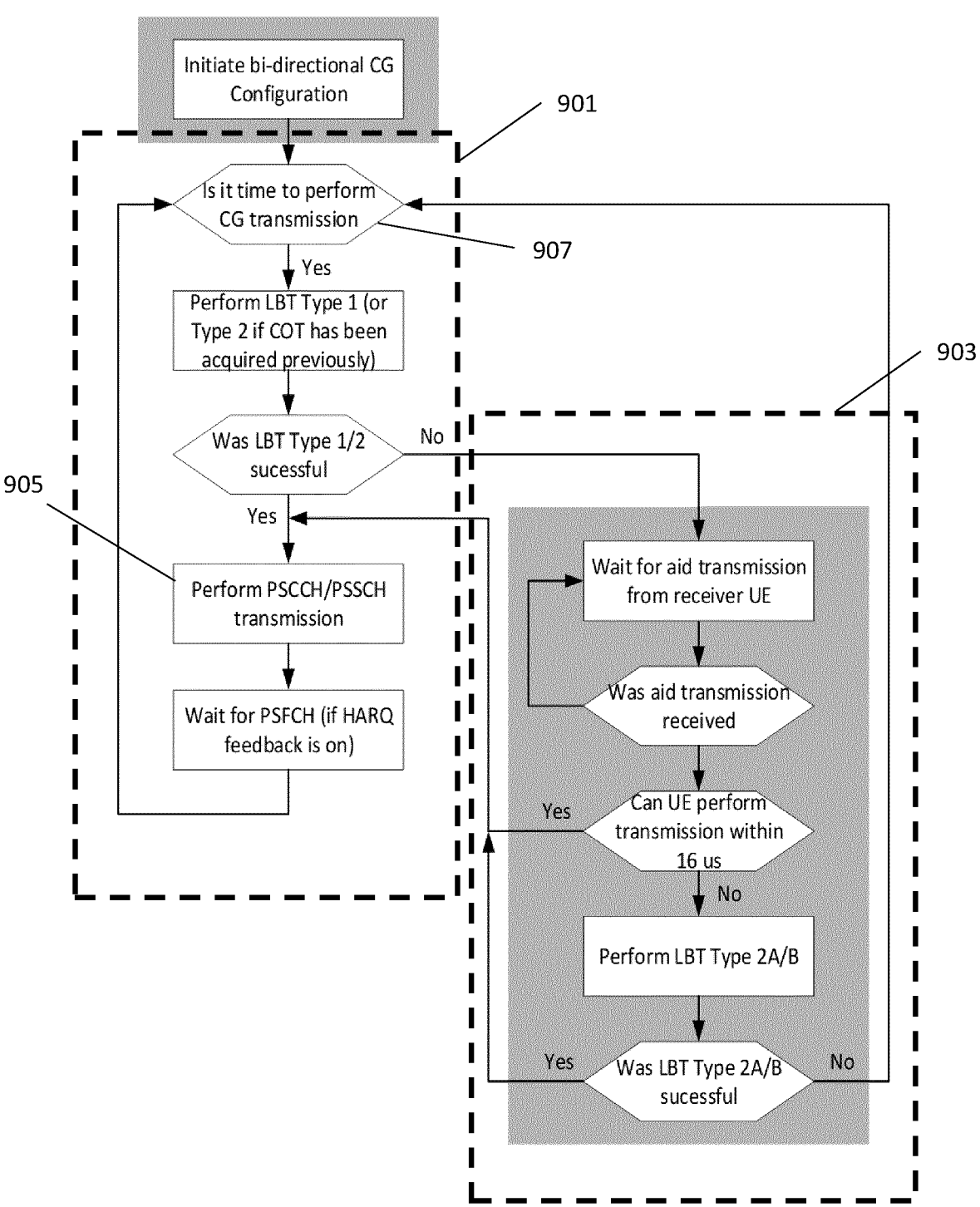
FIG. 9 is a flowchart of a method according to an example.

FIG. 9 is a flowchart of a method according to an example. The flowchart of FIG. 9 demonstrates the process described with reference to FIG. 8 from the perspective of the second UE (i.e., the transmitting device). In the set of blocks 901, the second UE (i.e., the transmitting device) can perform an LBT Type 1 (or 2) check. If this check is not successful, then the set of blocks 903. More specifically, the second UE 703 will, in this case, wait for a transmission 715 from the first UE 701. If received, the second UE can determine whether it is able to perform transmission within 16 μs—if so, the process reverts to block 905. Otherwise, an LBT Type 2A/B check (i.e., a second channel access process) can be performed by the second UE. If successful, the process reverts to block 905, otherwise it reverts to block 907.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 10:
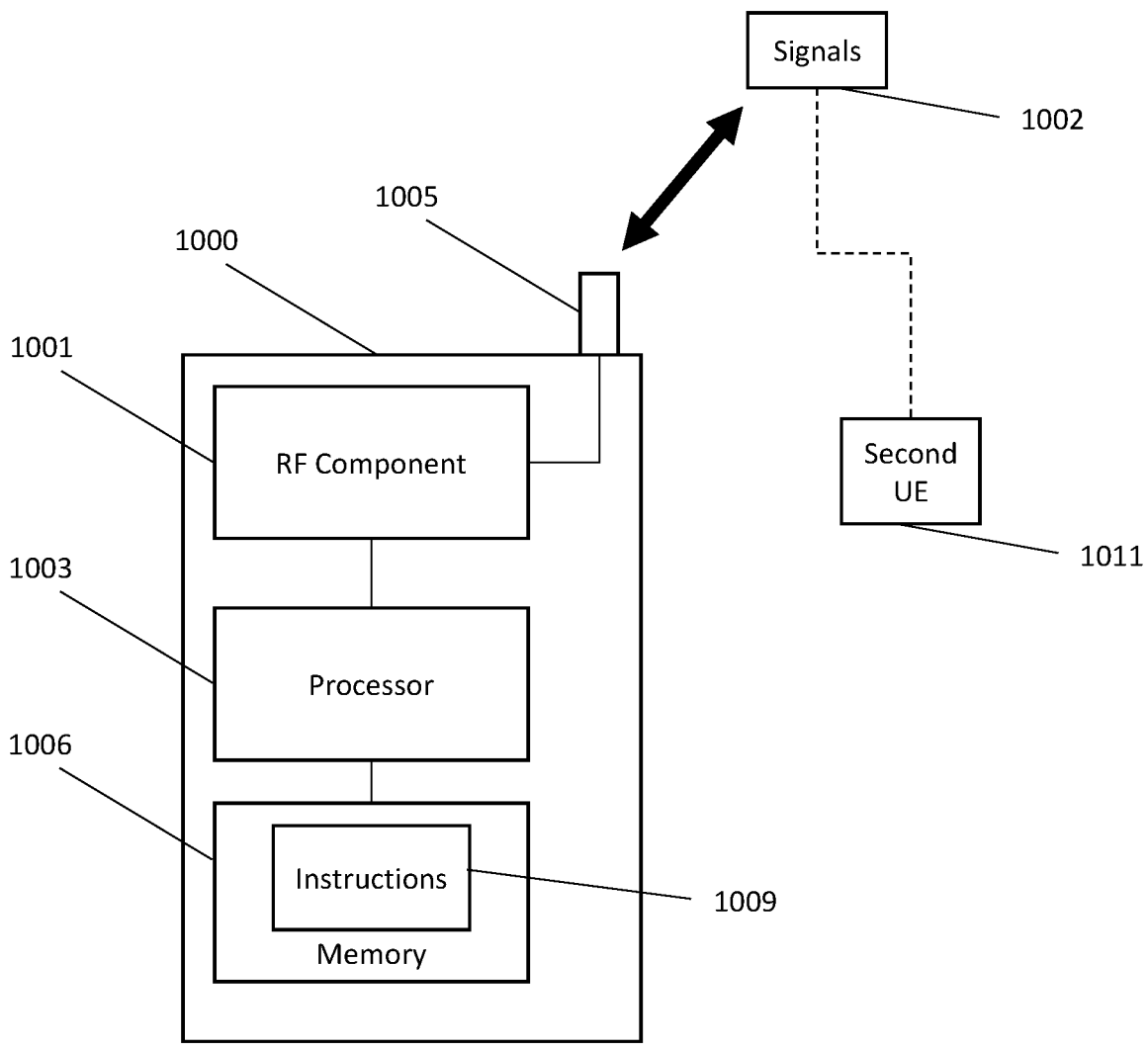
FIG. 10 is a schematic representation of a UE according to an example.

FIG. 10 is a schematic representation of a UE according to an example. UE 1000 comprises a radio frequency, RF, circuitry component 1001 configured to transmit or receive communication signals 1002 on an unlicensed (and/or licensed) spectrum (using e.g., antenna(e) 1005), and a processor 1003 coupled to the RF circuitry component 1001. A machine/computer-readable storage medium, such as memory 1006, stores executable machine-readable instructions 1009 that, in response to execution, cause the processor

1003 of UE 1000 to perform operations to aid the acquisition of an aligned sidelink communication session. In an example, the operations comprise receiving configured grant, CG, configuration data comprising bi-directional CG information for an aligned sidelink communication session within the unlicensed spectrum with a second UE 1011, monitor for receipt of a first transmission of the sidelink communication session, and acquire the channel for the sidelink communication session.

The processor 1003 can be further configured to generate a first listen before talk, LBT, protocol to determine a sidelink channel state, and in response to determining an idle channel state, communicate a feedback message indicating acquisition of the channel; and trigger a second LBT protocol at the second UE 1011.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

The invention claimed is:

1. A method of wireless communication, the method comprising:
   receiving a configured grant (CG) configuration data at a first UE from a second UE, the CG configuration data comprising bi-directional CG information for a communication session between the first UE and the second UE;
   monitoring for receipt of a first transmission of the communication session from the second UE at the first UE;
   on the basis of the monitoring, acquiring a channel for sidelink communication session at the first UE,
   wherein the method further comprises:
   performing a first channel access process, to enable access to the channel for a channel occupancy time; and
   transmitting a feedback message to the second UE indicating acquisition of the channel for the channel occupancy time.

2. The method as claimed in claim 1, wherein the feedback message is transmitted using a physical sidelink feedback channel specified in the CG configuration data.

3. The method as claimed in claim 1, wherein the feedback message is transmitted using a physical sidelink control channel or a physical sidelink shared channel.

4. The method as claimed in claim 3, further comprising transmitting the feedback message in a CG configuration data message.

5. The method as claimed in claim 3, further comprising transmitting the feedback message in a resource allocation message.

6. The method as claimed in claim 1, wherein performing the channel access process comprises performing listen before talk (LBT) radio protocol.

7. The method as claimed in claim 1, further comprising:
   performing a second channel access process at the second UE.

8. A user equipment comprising:

a radio frequency (RF) circuitry component configured to transmit or receive communication signals on an unlicensed spectrum; and a processor coupled to the RF circuitry component, configured to:

receive a configured grant (CG) configuration data comprising bi-directional CG information for an aligned sidelink communication session within the unlicensed spectrum with a second UE;

monitor for receipt of a first transmission of the aligned sidelink communication session; and acquire a channel for the aligned sidelink communication session, wherein the processor is further configured to:

generate a first listen before talk (LBT) protocol to determine a sidelink channel state; and in response to determining an idle sidelink channel state, communicate a feedback message indicating acquisition of the channel.

9. The user equipment as claimed in claim 8, wherein the processor is further configured to:

trigger a second LBT protocol at the second UE.

10. A computer-readable storage medium storing executable instructions that, in response to execution, cause a processor of a user equipment to perform operations to aid the acquisition of a communication session, the operations comprising:

receiving a configured grant (CG) configuration data comprising bi-directional CG information for an aligned sidelink communication session;

monitoring for receipt of a first transmission of the aligned sidelink communication session; and on the basis of the monitoring, acquiring a channel for the aligned sidelink communication session, wherein the processor is further caused to perform operations comprising:

triggering a second LBT protocol for the aligned sidelink communication session at a second UE.

11. The computer-readable storage medium as claimed in claim 10, further comprising instructions that, in response to execution, cause the processor to perform operations comprising:

generating a first listen before talk (LBT) protocol to determine a sidelink channel state; and in response to determining an idle sidelink channel state, communicating a feedback message indicating acquisition of the channel.

* * * * *